US012592655B2

(12) United States Patent
Bittner et al.

(10) Patent No.: US 12,592,655 B2
(45) Date of Patent: Mar. 31, 2026

(54) METHOD FOR OPERATING AN ELECTRIC MACHINE, ESPECIALLY IN A MOTOR VEHICLE, AND A MOTOR VEHICLE

(71) Applicant: AUDI AG, Ingolstadt (DE)

(72) Inventors: Florian Bittner, Gaimersheim (DE);
Stephan Brüske, Ingolstadt (DE);
Bastian Heidler, Kranzberg (DE);
Mathias Korn, Regensburg (DE)

(73) Assignee: AUDI AG, Ingolstadt (DE)

( * ) Notice: Subject to any disclaimer, the term of this patent is extended or adjusted under 35 U.S.C. 154(b) by 191 days.

(21) Appl. No.: 18/326,904

(22) Filed: May 31, 2023

(65) Prior Publication Data

US 2023/0396192 A1      Dec. 7, 2023

(30) Foreign Application Priority Data

Jun. 1, 2022    (DE) .......................... 102022113800.3

(51) Int. Cl.
*H02P 3/22*        (2006.01)
*B60L 3/00*        (2019.01)

(52) U.S. Cl.
CPC ................ *H02P 3/22* (2013.01); *B60L 3/003* (2013.01); *B60L 3/0046* (2013.01); *B60L 2240/427* (2013.01); *B60L 2240/547* (2013.01)

(58) Field of Classification Search
CPC .......... H02P 3/22; B60L 3/003; B60L 3/0046; B60L 2240/427; B60L 2240/547
(Continued)

(56) References Cited

U.S. PATENT DOCUMENTS 8,369,049 B2    2/2013   Kuehner et al.
9,634,553 B2    4/2017   Roessler et al.
(Continued)

FOREIGN PATENT DOCUMENTS

DE      102006003254 A1 *   7/2007
DE      102011017712 A1    10/2012
(Continued)

OTHER PUBLICATIONS

Kuehner et al. (DE 102006003254 A1)Operating Method For Electrical Machine With Pulse-controlled Inverter In Case Of Disturbance, Involves Switching Electrical Machine Into De-energizing Mode And Into Short-circuit Mode (Year: 2007).*
(Continued)

*Primary Examiner* — Jorge L Carrasquillo
(74) *Attorney, Agent, or Firm* — Seed Intellectual Property Law Group LLP

(57)                ABSTRACT

A method for operating an electric machine including a rotor and a stator is connected to a first or a second power electronics assembly (PEA), the first or the second PEA including a circuit arrangement that produces a freewheeling condition or an active short circuit condition for a winding of the rotor or the stator, to a DC voltage network having a battery, and the first or the second PEA including an inverter formed by the circuit arrangement. The method includes, in response to a primary fault signal indicating a fault the first or the second PEA, actuating the first or the second PEA to produce the freewheeling condition, and in response to a secondary fault signal indicating a nonreceptiveness of the battery for power fed by the electric machine to the DC voltage network, actuating both the first and the second PEA to produce the active short circuit condition.

15 Claims, 2 Drawing Sheets

(58) Field of Classification Search

USPC .......................................................... 318/379

See application file for complete search history.

(56) References Cited

U.S. PATENT DOCUMENTS

| 11,515,763 | B2 | 11/2022 | Graßl | |
| 2014/0062368 | A1* | 3/2014 | Roessler | B60L 3/04 |
| | | | | 363/55 |
| 2014/0375238 | A1 | 12/2014 | Kurfiss et al. | |
| 2015/0214858 | A1* | 7/2015 | Raichle | H02M 7/537 |
| | | | | 363/131 |
| 2022/0094297 | A1* | 3/2022 | Lacaux | H02P 27/06 |

FOREIGN PATENT DOCUMENTS

| DE | 102016220235 | A1 | 4/2018 |
| DE | 102018203739 | A1 | 9/2019 |
| DE | 102019124214 | A1 | 3/2021 |
| DE | 102020206478 | A1 | 11/2021 |
| EP | 3501876 | A1 | 6/2019 |

OTHER PUBLICATIONS

Danjo et al. (JP 2010158089 A) Motor Control Device (Year: 2010).*

* cited by examiner

METHOD FOR OPERATING AN ELECTRIC MACHINE, ESPECIALLY IN A MOTOR VEHICLE, AND A MOTOR VEHICLE

BACKGROUND

Technical Field

The disclosure relates to a method for operating an electric machine, especially in a motor vehicle, comprising a rotor and a stator as its main components, wherein at least one of the main components is hooked up across an actuated power electronics assembly having a circuit arrangement, by which a freewheeling condition and an active short circuit condition can be produced for at least one winding of the main component, to a DC voltage network having a battery, wherein one of the at least one power electronics assemblies comprises an inverter formed by the circuit arrangement, wherein upon appearance of a primary fault signal indicating a fault at least one of the at least one power electronics assemblies is actuated to produce the freewheeling condition for the respective main component. In addition, the disclosure relates to a motor vehicle.

Description of the Related Art

In electrically operated motor vehicles, such as electric motor vehicles and hybrid motor vehicles, it is usual to provide an electric machine by which the motor vehicle can be driven or with which electric power can be generated and fed into a corresponding DC voltage network (high-voltage network) of the motor vehicle, for example in order to be stored in a battery feeding the DC voltage network. The electric machine will usually have working windings provided on the stator, thus in particular stator windings, which are connected across an inverter, known as the traction inverter, to the DC voltage network. Three phases are often used for this, so that the inverter can be formed for example by a so-called B6 bridge circuit as an actuated circuit arrangement. By contrast with typical low-voltage networks in motor vehicles, the rated voltage (operating voltage) of which can usually be 12 Volt or 48 Volt, DC voltage networks used to operate in particular three-phase electric machines for the propulsion of a motor vehicle have rated voltages in the range of 350 Volt to 1000 Volt, for example. For the most part, IGBTs and/or MOSFETs, especially SiC-MOSFETs, are used as the switches of the circuit arrangement of the inverter.

Various types of electric machines have already been proposed for use in motor vehicles, for example permanent excited synchronous machines (PSM) and asynchronous machines (ASM), while recently externally excited synchronous machines (ESM) have also been often proposed as drive machines for electrified motor vehicles. A further power electronics assembly having an exciter circuit is added as an additional power electronics assembly to the power electronics assembly comprising the inverter of the main component of the electric machine carrying the exciter winding, especially the rotor, while the exciter circuit can also comprise a circuit arrangement, such as a half-bridge (or even a full bridge) in order to achieve various conditions, such as a freewheeling condition and/or an active short circuit condition (ACS condition) not only for the working windings, but also for the exciter winding (usually the rotor winding).

In such a DC voltage network utilizing high voltage, especially in regard to the electric machine, the battery, and/or the power electronics assemblies connecting these to the DC voltage network, fault conditions can occur, or external fault conditions may be relevant to ensuring the safety of use and the functional safety. In order to identify such fault conditions, a number of variants have already been proposed in the prior art. Thus, for example, DE 10 2016 220 235 A1 relates to a method of identifying a fault in a generator unit, which comprises an electric machine having a rotor winding (and stator winding) and a rectifier connected to it, by which the electric machine is hooked up to a power grid, and during at least one time interval in which a switching unit serving to apply an exciter voltage to the rotor winding is in a position there is plotted the time function of the exciter current through the rotor winding, which can be compared to a comparison plot of the exciter current, in order to ascertain a defect of the generator unit.

DE 10 2018 203 739 A1 relates to a method for identifying a fault condition of an electric machine having a rotor, a stator, and an inverter circuit connected to the stator, wherein first, second and third current strengths for phase currents are determined and from two of the phase currents a theoretical first current strength is determined, and an evaluation value is determined from the detected first current strength and the theoretical first current strength and an evaluation is done as to whether a fault condition of the electric machine is present or not in dependence on this evaluation value.

Other possibilities for the determination of fault situations involve threshold value comparisons of other characteristics of the DC voltage system and/or the alternating current components, as well as the consideration of other fault sources or fault situations outside the DC voltage network and the electric machine, such as the occurrence of an accident with the motor vehicle, especially as a crash signal.

In such fault situations, the primary safety goal is to clear the electric machine of torque. Thus, in order to meet the requirements of functional safety, it has been proposed to open all switches of the circuit arrangement of the inverter upon detecting a fault in permanent excited synchronous machines and asynchronous machines, in order to bring about a freewheeling condition as a safe condition. Alternatively, switches of one side of the B6 bridge circuit can be opened and those of the other side closed during a fault, so that depending on the switch group chosen a highside (HS)-active short circuit condition or a lowside (LS)-active short circuit condition is achieved as the safe condition. If an externally excited synchronous machine is used, by contrast with the permanent excited synchronous machine, the excitation can be switched off, thereby likewise achieving torque freedom. Hence, an additional degree of freedom exists for achieving the safety goal. Therefore, multiple fault responses are basically conceivable in an externally excited synchronous machine, namely, a freewheeling condition in stator and rotor, freewheeling condition in the stator and ACS condition in the rotor, ASC condition in the stator and freewheeling condition in the rotor, as well as ASC condition in the stator and rotor.

However, it must be taken into account that, at least with some of the conceivable fault situations, a load shedding may also occur with respect to the battery, that is, the battery contactors which connect the battery to the DC voltage network will be opened. Such a load shedding is also known in English as a "load dump." If there occurs a freewheeling during such a load shedding for at least one main component, i.e., the rotor or the stator, of the electric machine, as is the usual fault response, the electric power introduced into the DC voltage network by the corresponding power electronics assembly cannot be put into the battery, so that the voltage in the DC voltage network increases so fast, for example by charging a usually present intermediate circuit capacitor, that a response by a corresponding control unit utilizing pulse width modulation, such as a microcontroller, is not possible. In this case, the DC voltage in the DC voltage network may increase, for example on the order of magnitude of 1 Volt per microsecond (1 V/μsec), depending on the capacitance, the electric machine, and the operating point.

Freewheeling fault responses are therefore conducive to a fast decay of the torque of the electric machine and they avoid ASC-typical strong braking moments, but they result in a large power input in the DC voltage network, especially in an intermediate circuit associated with the inverter. In the event of a load shedding or in other cases where the load input cannot be taken up by the battery, a maximum allowable voltage in the DC voltage network can therefore be exceeded, so that components, especially semiconductor components, may become disrupted. In order to solve these problems, it has been proposed to use a larger intermediate circuit capacitor, although this requires more design space in detrimental manner and causes higher costs. On the other hand, an activation of the active short circuit upon detecting a fault would result in the generating of higher currents in the power semiconductors, especially the inverter, which might bring about a thermal disruption of the power semiconductors, so that usually a freewheeling with appropriately larger design of the intermediate circuit is ordinarily used to solve the problems.

DE 10 2019 124 214 A1 relates to a method for operating a motor vehicle having a permanent excited synchronous machine, wherein the windings of the synchronous machine are hooked up to an onboard network of the motor vehicle across an inverter comprising a circuit arrangement and a capacitor in an intermediate circuit and the circuit arrangement can be actuated by a control device hooked up to the onboard network. If an external drive of the motor vehicle is present, it should be possible to continue operating the control device, and to avoid a constant starting of the control device it is proposed to maintain the voltage for operating the control device in a particular voltage range by a permanent alternating of charging operation through the permanent excited synchronous machine and discharging operation through the power supply of the circuit arrangement, thus regularly switching to an active short circuit (ASC).

BRIEF SUMMARY

Embodiments of the disclosure provide an improved fault handling procedure, especially one which protects semiconductor components and/or requires a less expensive design of an intermediate circuit.

As the solution for this problem, in a method of the kind mentioned above, it is proposed according to the disclosure that, upon appearance of a secondary fault signal indicating a nonreceptiveness of the battery for power fed by the electric machine to the DC voltage network all power electronics assemblies are actuated to produce an active short circuit condition.

The second fault signal here preferably indicates the presence of a load shedding (load dump) on the part of the battery, but it can also be configured such that it indicates, especially in addition, an otherwise prevented power input into the battery. Thus, on the whole, a two-stage fault response is proposed, whereby in the first fault response a freewheeling in stator and/or rotor, more precisely corresponding windings, is implemented at least one time.

This fault response occurs on the basis of a basically familiar primary fault signal indicating as the first in time sequence the presence of a fault, and after this first fault response the power from the stator or rotor is put into the battery in all fault situations except those in which a load shedding on the part of the battery (load dump situation) or some other hindrance on putting power into the battery occurs. No further fault response need occur. However, if the putting of the power into the battery is not possible, especially on account of a load shedding, for example due to the opening of battery contactors associated with the battery, then after the first fault response electric power will be put into the DC voltage network, especially into an intermediate circuit, so that a corresponding flow of current will be present and/or the voltage will rise in the DC voltage network, especially in the intermediate circuit. This can be detected and it is described by the presence of the secondary fault signal, generated in time after the primary fault signal, so that an active short circuit condition is then produced in all windings hooked up by way of circuit arrangements to the DC voltage network, so that a further power input into the DC voltage network and thus into the intermediate circuit is prevented. In other words, after the occurrence of the primary fault signal and the first fault response, monitoring is done to determine whether the secondary fault signal is also present afterwards, in order to then initiate the second fault response in this case.

It is preferably provided, especially as a kind of buffer, that an intermediate circuit energy accumulator, especially at least one intermediate circuit capacitor, is used in the DC voltage network, especially as part of at least one of the at least one power electronics assemblies being switched to the freewheeling condition. For example, such an intermediate circuit capacitor as part of an intermediate circuit of the inverter or associated with it is already known in the prior art. Thus, when power is put into the DC voltage network and it cannot be passed on to the battery, the intermediate circuit energy accumulator, especially the intermediate circuit capacitor, is then primarily charged. Thanks to the potentially two-stage fault response proposed according to the disclosure, however, it can be provided with special advantage that the intermediate circuit, especially the intermediate circuit energy accumulator, is not designed for the fault response and therefore need not be overdimensioned for normal operation. In other words, it can thus be provided according to the disclosure that an energy accumulator is used as the intermediate circuit energy accumulator which is designed for the normal operation, especially for a maximum overshooting by 10 to 20% (or even up to 30%) of the rated voltage of the DC voltage network. At the same time, nevertheless, load limits for other endangered semiconductor components in the DC voltage network or DC voltage components connected to it are maintained, despite there being a reduced necessary intermediate circuit capacitance in the case of an intermediate circuit capacitor.

The optionally temporary setting of the freewheeling condition has the further advantage that ASC currents occurring in the active short circuit when the secondary fault signal is present are reduced, since a substantial decaying of the torque in the electric machine has already occurred. As a further benefit of the present disclosure, it should also be noted in general that the fault response is simplified overall, since when the primary fault signal appears it is no longer necessary to distinguish between load shedding and all other faults, but instead the load shedding can be advantageously handled if so required at a later point in time.

It should be further noted in this place that the method can be carried out with special benefit for an electric machine of a motor vehicle, and therefore it can be advantageously embedded in a method for operation of the motor vehicle. The DC voltage network, generally speaking, is a high-voltage network, the rated voltage (operating voltage) of which is higher than the rated voltage of a low-voltage network likewise provided in the motor vehicle and/or greater than 200 Volt, in particular, it can be chosen in the range of 350 to 1000 Volt.

The determination of the primary fault signal can basically make use of procedures already known in the prior art. In particular, it can be provided that the primary fault signal is provided by a safety control unit monitoring the DC voltage network and/or the battery and/or the electric machine, such as an ASIL chip. In particular, the secondary fault signal can also be provided by such a safety control unit. In particular, however, as regards the secondary fault signal, easily verified conditions are also conceivable for generating it.

In one embodiment of the disclosure, it can be provided that the primary fault signal is generated upon overshooting a first voltage threshold value by the voltage in the DC voltage network and/or the secondary fault signal is generated upon overshooting a second voltage threshold value, which is higher in particular than the first voltage threshold value. Therefore, while the primary is generated at least, in particular along with other possibilities for its being generated, if the first voltage threshold value has been exceeded, a definite two-stage assessment of the criticality is assured already thanks to the setting of the voltage threshold values when a higher second voltage threshold value is used for generating the second fault signal. Independently of the use of the first voltage threshold value, it can be provided that the second voltage threshold value indicating a voltage surge in the DC voltage network is chosen in dependence on a design limit of at least one semiconductor component of at least one of the at least one power electronics assemblies and/or that of another network component hooked up to the DC voltage network and/or in dependence on a normal operation parameter of the DC voltage network indicating a normal operation, especially one allowing an overshooting of the normal operation parameter chosen in the range of 10 to 20%. For example, if the semiconductor components used in the DC voltage system are basically designed to allow a 10 to 20% overshooting of normal operation parameters, the second voltage threshold value especially when using a safety margin can be chosen according to this permissible tolerance. For example, if the semiconductor components are chosen such that they allow a 20% tolerance in regard to the voltage, the second voltage threshold value can be chosen as one exceeding the rated voltage by 18%. Even when discrete design limits are known for semiconductor components, a corresponding choice can also be made, especially by using a safety margin, and especially paying heed to the at least one most sensitive component.

The voltage can advisedly be measured in the intermediate circuit, especially at the intermediate circuit energy accumulator. Measurement units, especially sensors, are usually provided anyway in such DC voltage systems at present, having electric machines connected across an inverter in a power electronics assembly, in order to register various characteristics of the power electronics assembly, so that in particular a voltage measuring unit associated anyway with the intermediate circuit energy accumulator, especially the intermediate circuit capacitor, can also be used to make possible the at least one threshold value comparison with the at least one voltage threshold value.

It should further be noted in this place that other characteristics describing the workload of the DC voltage network can also be used to perform threshold value comparisons, for example the current flow in the intermediate circuit and/or at another place in the DC voltage network. As in the case of the second voltage threshold value, the threshold values are generally chosen in particular to prevent a damaging of semiconductor components, in the case of the voltage threshold value by the voltage surge.

In addition or alternatively, it is also conceivable in the scope of the present disclosure for the secondary fault signal to be generated automatically after the expiration of a predefined time interval, especially if the primary fault signal is persistently present. This time interval can be chosen such, for example, that a defined torque decay has already occurred by virtue of the freewheeling and/or at most a maximum allowable power input to the DC voltage network has occurred. The time interval can also be chosen dynamically, for example, in dependence on a given state of charge of the intermediate circuit energy accumulator when the primary fault signal is present, or also that of the battery if its receptiveness in this regard is questionable.

The method according to the disclosure can also be used with special advantage as an electric machine in externally excited synchronous machines. Thus, it can be provided that both the rotor and the stator are associated with one of the two provided and actuated power electronics assemblies for connection to the DC voltage network, wherein the first power electronics assembly comprises the inverter and the second power electronics assembly comprises an exciter circuit for an exciter winding of the electric machine configured as an externally excited synchronous machine. In such a configuration it is provided that upon appearance of the secondary fault signal both power electronics assemblies are actuated to produce an active short circuit condition. In particular, it can be provided that the rotor is externally excited by the exciter circuit.

For externally excited synchronous machines, it is thus proposed to utilize, for increased safety, a circuit arrangement already present anyway as part of the exciter circuit, allowing various switching states for the exciter winding, including in any case the active short circuit condition, so as to switch to the active short circuit condition also with respect to the exciter winding not later than the appearance of the secondary fault signal. For the appearance of the primary fault signal, a choice can be made between the switching of both types of winding, i.e., the exciter winding and the at least one working winding, to the freewheeling state (stator and rotor in freewheeling), or the switching of freewheeling only for the stator or only for the rotor. This choice can be made to depend, in particular, on which ASC currents the switches of the particular circuit arrangement can withstand, so that for circuit arrangements having switches with good robustness anyway the active short circuit condition can be produced at once, while the switches of the other circuit arrangements will be better protected at first by freewheeling. This may be the case, for example, if the switches of the circuit arrangements are dimensioned rather tight in regard to the possible ASC currents. According to the disclosure, however, it is preferable to bring about the freewheeling for both the stator and the rotor, so that a certain protective effect is assured for both circuit arrangements.

Besides the method, the present disclosure also relates to a motor vehicle, comprising a control device, a DC voltage network, a battery hooked up to the DC voltage network and an electric machine, comprising a rotor and a stator as its main components, wherein at least one of the main components is hooked up across a power electronics assembly actuated by way of the control device, having a circuit arrangement by which a freewheeling condition and an active short circuit condition can be produced for at least one winding of the main component, to the DC voltage network, wherein one of the at least one power electronics assemblies comprises an inverter formed by the circuit arrangement, wherein the control device upon appearance of a primary fault signal indicating a fault is adapted to actuate at least one of the at least one power electronics assemblies to produce the freewheeling condition for the respective main component, which motor vehicle is further characterized in that the control device upon appearance of a secondary fault signal indicating a nonreceptiveness of the battery for power fed by the electric machine to the DC voltage network is adapted to actuate all power electronics assemblies to produce an active short circuit condition.

In other words, the control device is adapted to carry out a method according to the disclosure. In particular, the safety control unit so provided can form part of the control device, but it can also be provided externally to it and provide the corresponding signals. The control device can be a controller, for example.

All remarks regarding the method according to the disclosure can apply accordingly to the control device according to the disclosure, and hence the benefits already mentioned can be obtained with it.

BRIEF DESCRIPTION OF THE SEVERAL VIEWS OF THE DRAWINGS

Further benefits and details of the present disclosure will emerge from the exemplary embodiments described in the following, as well as the drawings.

DETAILED DESCRIPTION

Figure 1:
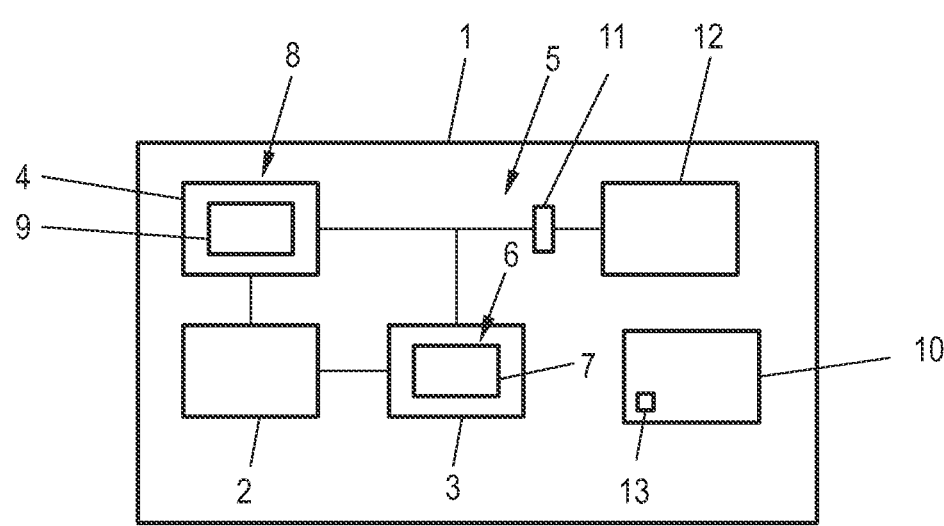
FIG. 1 shows a schematic diagram of a motor vehicle according to the disclosure.

FIG. 1 shows a schematic diagram of a motor vehicle 1 according to the disclosure, being configured in the present case as an electric motor vehicle. The motor vehicle 1 comprises, as part of a drive train not otherwise shown here, an electric machine 2, being configured as an externally excited synchronous machine (ESM). The rotor here as the first main component of the electric machine 2 comprises an exciter winding, while the stator as the second main component of the electric machine 2 comprises stator windings or working windings, in the present case working with three phases, and hence three stator windings are provided.

The electric machine 2 is connected across a first power electronics assembly 3 and a second power electronics assembly 4 to a DC voltage network 5, having a higher rated voltage (operating voltage) than a low-voltage network of the motor vehicle 1, for example in the range of 350 to 1000 Volt. The DC voltage network is hence a high-voltage network.

The first power electronics assembly 3 connects the stator windings as the working windings to the DC voltage network 5 and comprises an inverter 6, having as its circuit arrangement 7 a B6 bridge circuit. The exciter winding, here, the rotor winding, is connected across the second power electronics assembly 4, having an exciter circuit 8 with a circuit arrangement 9 likewise configured as a bridge circuit, to the DC voltage network 5. A freewheeling condition and an active short circuit condition (ACS condition) can be established through both circuit arrangements 7, 9 for the corresponding windings. For this, the circuit arrangements 7, 9 as well as the power electronics assemblies 3, 4 can be actuated overall by way of a control device 10 of the motor vehicle 1.

The DC voltage network 5 is moreover connected by a circuit arrangement 11 having battery contactors to a battery 12 feeding the DC voltage network 5 and being chargeable from it. Further network components can also be hooked up to the DC voltage network 5, especially those having their own semiconductor components at the DC voltage network side, for example a DC voltage converter for the low-voltage network, an electrical air conditioning compressor, an electrical heater and/or an onboard charger of the motor vehicle 1. For sake of clarity, these are not otherwise shown here in the drawing.

The control device 10 is configured to carry out the method according to the disclosure, as shall be further discussed in the following. In the present case, the control device 10 itself also comprises a safety control unit 13, such as an Automotive Safety Integrity Level (ASIL) chip. Otherwise, the control device 10 can also be connected to such a safety control unit 13. Various fault signals can be generated at least partly on the part of the safety control unit 13, optionally also by way of other components of the control device 10.

A primary fault signal indicates the presence of a fault involving at least the electric machine 2, the power arrangements 3, 4, the high-voltage network 5 and/or the battery 12, also possibly being present in one of these components. However, a signal indicating a fault can also be a general motor vehicle signal of the motor vehicle 1, for example an accident signal, referring to generally necessary safety of use and functional safety. When the primary fault signal is present, the control device 10 is designed to switch at least one of the main components, i.e., the stator and/or the rotor, to a freewheeling condition by actuating at least one of the circuit arrangements 7, 9. Thus, in this first fault response, either only the exciter winding (rotor winding) or only the working windings (stator windings) or both are switched to a freewheeling condition.

A secondary fault signal, which is preferably generated by the control device 10 or provided by the safety control unit 13 only when the primary fault signal is present, indicates that the battery 12 cannot take up any electric power from the DC voltage network 5. In particular, this is the case when a load shedding has occurred, i.e., the battery contactors of the circuit arrangement 11 have been opened (load dump). If the secondary fault signal is present in the control device 10 after the first fault response, the latter is designed to trigger a second fault response, in which the switching device 7 and/or the switching device 9 are actuated to bring about the active short circuit now for the rotor and the stator, i.e., both of the main components, in the corresponding windings, i.e., both the working windings and the exciter winding.

Figure 2:
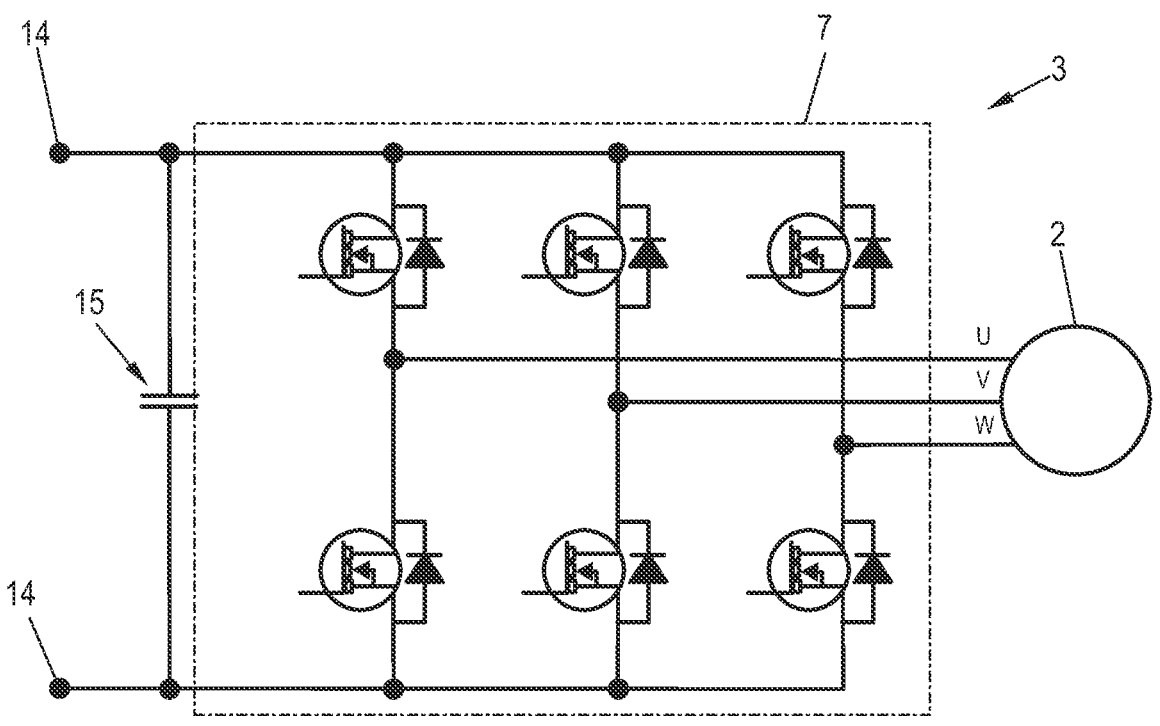
FIG. 2 shows a circuit diagram of a first power electronics assembly.

FIG. 2 shows one possible configuration of the power electronics assembly 3 and hence the circuit arrangement 7 more precisely. As can be seen, this is configured as a B6 bridge circuit, which is basically familiar, providing corresponding arrangements of semiconductor switches, for example SiC-MOSFETs, and freewheeling diodes for each of the three phases U, V, W of the not otherwise shown stator windings of the electric machine 2, in order to connect them to terminals 14 of the DC voltage network 5. The power electronics assembly 3 also has an intermediate circuit capacitor 15 as an intermediate circuit energy accumulator in an intermediate circuit. The intermediate circuit capacitor 15 is designed only for the normal operation, and hence not overdimensioned, since an "overloading" which might damage the semiconductor components is avoided by virtue of the two-stage fault handling, as shall be described more fully.

Figure 3:
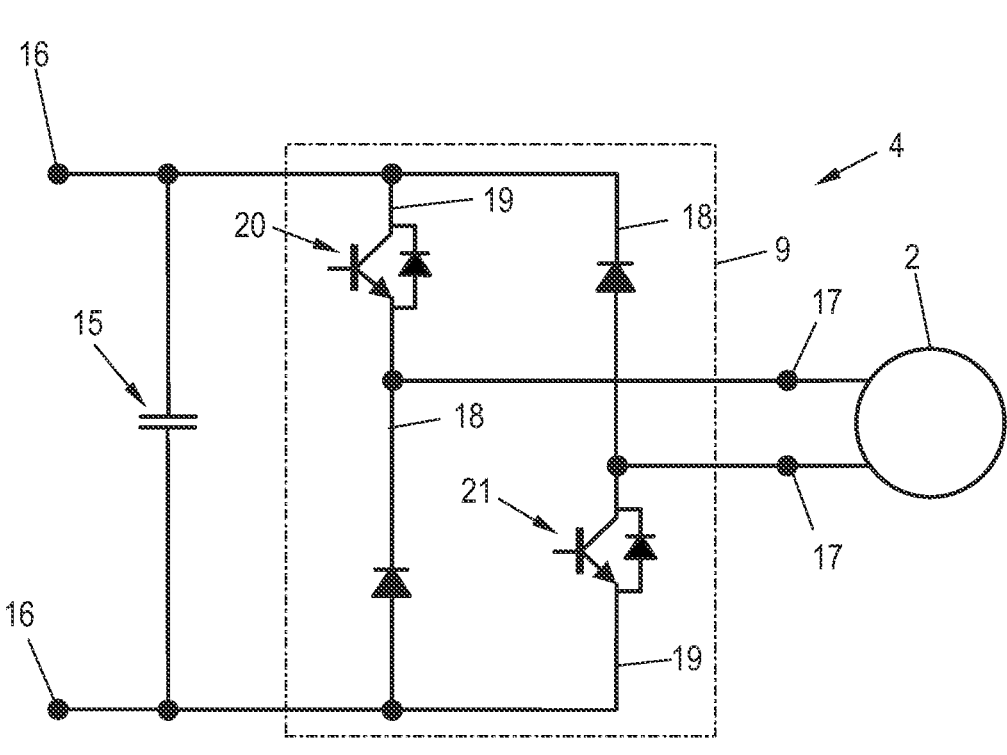
FIG. 3 shows a circuit diagram of a second power electronics assembly.

FIG. 3 shows the power electronics assembly 4, and thus in particular the circuit arrangement 9 for the exciter winding/exciter circuit more precisely, which can also optionally have its own intermediate circuit with corresponding intermediate circuit capacitor 15. For the connection of the terminals 16 of the DC voltage network 5 to terminal points 17 for the exciter winding, here, the rotor winding, in the electric machine 2, a half-bridge is provided in the present case as the circuit arrangement 9, having freewheeling diodes in each of the branches 18, 19 and semiconductor switches 20, 21 bridging over them in the branches 19. The semiconductor switches 20 can also be configured, for example, as SiC-MOSFETs. Alternatively, both the semiconductor switches 20, 21 and the switches of the circuit arrangement 7 can also be configured as IGBTs.

Freewheeling conditions can be brought about in both circuit arrangements 7, 9 by opening all semiconductor switches, controlled by the control device 10, while active short circuit conditions can be brought about by opening the semiconductor switches of only one half, such as the top half per FIG. 2 or the semiconductor switch 20 in FIG. 3, or the bottom half per FIG. 2 or the semiconductor switch 21 of FIG. 3, specifically here a highside-ASC or a lowside-ASC.

Figure 4:
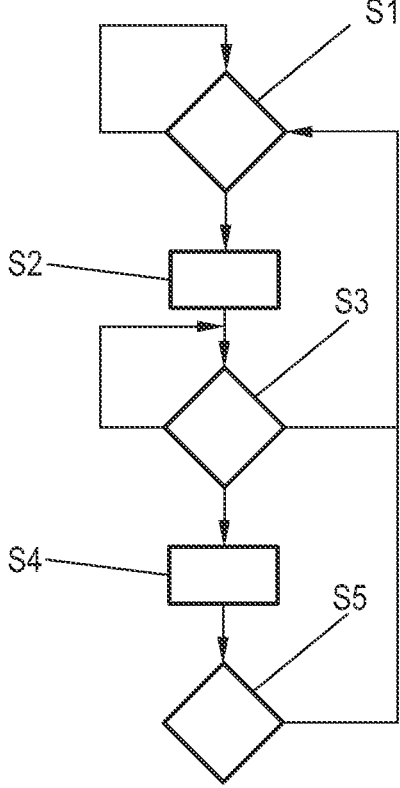
FIG. 4 shows a flow chart of an exemplary embodiment of the method according to the disclosure.

This shall be explained more closely in the now described exemplary embodiment of the method according to the disclosure per FIG. 4. The method is carried out by way of the control device 10.

In step S1 there is watching to see whether the primary fault signal indicating a fault (in general) is present. If so, then in step S2 there occurs the first fault response, that is, the circuit arrangements 7, 9 of the power electronics assemblies 3, 4 are actuated such that either all the windings of the electric machine 2, i.e., both for the rotor and for the stator, are in the freewheeling condition, or the freewheeling condition is established only for the rotor or only for the stator, while the other respective main component, more precisely its windings, are switched to the active short circuit condition.

At this point it should be noted in particular that the primary fault signal can also be generated when a voltage of the DC voltage network 5, especially one measured at the intermediate circuit capacitor 15, exceeds a first threshold value. Because at least one winding is in the freewheeling condition, further electric power is now fed into the DC voltage network 5 during the torque decay of the electric machine 2, which fills up the intermediate circuit capacitor 15 at least when the battery 12 cannot take it up and this would then result in a voltage surge.

In step S3, a check is made to see whether the secondary fault signal is present, indicating a nonreceptiveness of the battery for power fed from the electric machine 2 to the DC voltage network 5. In regard to the previous remarks, it is conceivable that the secondary fault signal can be generated, regardless of using the mentioned first voltage threshold value, if a second voltage threshold value is exceeded which is higher than the first voltage threshold value. Since the electric power provided cannot be taken up by either the battery 12 or the intermediate circuit capacitor 15, this result in excessively high voltage. The second voltage threshold value can be chosen, for example, with a safety margin, in dependence on a design limit of at least one of the semiconductor components. It is also possible for the second voltage threshold value to refer to a normal operation, as described by a normal operation parameter, such as the rated voltage as the normal operation parameter, so that for example when the most sensitive semiconductor components are designed such that they can withstand deviations of up to 20%, the second voltage threshold value can be assumed at 18% of the rated voltage.

It should be noted further that if in step S3 the primary fault signal is no longer present, i.e., the ending of the fault is indicated, there can occur an immediate return to step S1. This means that, for example if no load shedding is taking place on the part of the battery 12, the first fault response may already be enough. Special consideration of the load shedding (or other nonreceptiveness of the battery 12) need not be done separately in step S1, but rather it is enough to do this in step S3.

If the secondary fault signal is present while the primary fault signal continues to indicate a fault, in step S4 the actuating of the corresponding circuit arrangements 7 and 9 on the part of the control device 10 makes sure that now all windings are in the active short circuit condition. The temporary setting of the freewheeling conditions has already reduced the dynamically occurring ASC currents so that an overloading of the semiconductor switches in the circuit arrangements 7, 9, such as the semiconductor switches 20, 21, need no longer be feared.

Then, if it is ascertained in a step S5 that the fault is ended, for example by the disappearance of the primary fault signal, there is a return to step S1 once again.

German patent application no. 102022113800.3, filed Jun. 1, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating an electric machine including a rotor and a stator wherein at least one of the rotor or the stator is connected to at least one of a first power electronics assembly and a second power electronics assembly, wherein the at least one of the first power electronics assembly and the second power electronics assembly includes a circuit arrangement that produces a freewheeling condition or an active short circuit condition for a winding of the rotor and the stator to a Direct Current (DC) voltage network connected by a circuit arrangement having battery contactors to a battery, wherein the first power electronics assembly and the second power electronics assembly are included in the DC voltage network, wherein the circuit arrangement having battery contactors is different from the first power electronics assembly and the second power electronics assembly included in the DC voltage network, and wherein the at least one of the first power electronics assembly and the second power electronics assembly includes an inverter formed by the circuit arrangement, the method comprising:

in response to a primary fault signal indicating a fault of the at least one of the first power electronics assembly and the second power electronics assembly, actuating the at least one of the first power electronics assembly or the second power electronics assembly to produce the freewheeling condition for the rotor and the stator;

after the freewheeling condition is produced for the rotor and the stator, checking for presence of a secondary fault signal indicating a nonreceptiveness of the battery for power fed by the electric machine to the DC voltage network due to an opening of the battery contactors of the circuit arrangement while the primary fault signal continues to indicate the fault; and in response to determining that the secondary fault signal indicating a nonreceptiveness of the battery for power fed by the electric machine to the DC voltage network due to the opening of the battery contactors of the circuit arrangement is present while the primary fault signal continues to indicate the fault, actuating both the first power electronics assembly and the second power electronics assembly to produce the active short circuit condition.

2. The method according to claim 1, wherein the DC voltage network includes an intermediate circuit energy accumulator.

3. The method according to claim 2, wherein the intermediate circuit energy accumulator includes at least one intermediate circuit capacitor.

4. The method according to claim 3, wherein the intermediate circuit energy accumulator is part of the at least one of the first power electronics assembly or the second power electronics assembly in which the freewheeling condition is produced.

5. The method according to claim 2, wherein the intermediate circuit energy accumulator operates with a maximum overshooting by 10 to 20% of a rated voltage of the DC voltage network.

6. The method according to claim 1, wherein the primary fault signal or the secondary fault signal is provided by a safety control unit monitoring the DC voltage network or the battery or the electric machine.

7. The method according to claim 1, wherein the primary fault signal is generated upon overshooting a first voltage threshold value by a voltage in the DC voltage network and the secondary fault signal is generated upon overshooting a second voltage threshold value by the voltage in the DC voltage network, and wherein the second voltage threshold value is higher than the first voltage threshold value.

8. The method according to claim 7, wherein the second voltage threshold value indicates a voltage surge in the DC voltage network, and wherein the second voltage threshold value is based on a design limit of at least one semiconductor component of the first power electronics assembly or the second power electronics assembly.

9. The method according to claim 7, wherein the second voltage threshold value indicates a voltage surge in the DC voltage network, and wherein the second voltage threshold value is based on or a design limit of a network component connected to the DC voltage network.

10. The method according to claim 7, wherein the second voltage threshold value indicates a voltage surge in the DC voltage network, and wherein the second voltage threshold value is based on an operation parameter of the DC voltage network that enables overshooting by 10 to 20% of the operation parameter.

11. The method according to claim 1, wherein the secondary fault signal is generated automatically after expiration of a predefined time interval.

12. The method according to claim 1, wherein the secondary fault signal is generated automatically if the primary fault signal is persistently present.

13. The method according to claim 1, wherein both the rotor and the stator are associated with the at least one of the first power electronics assembly or the second power electronics assembly for connection to the DC voltage network, wherein the first power electronics assembly includes the inverter and the second power electronics assembly includes an exciter circuit for an exciter winding of the electric machine, and wherein the electric machine is an externally excited synchronous machine.

14. The method according to claim 13, wherein the rotor is externally excited by the exciter circuit.

15. A motor vehicle, comprising:

a control device;

a Direct Current (DC) voltage network;

a battery connected by a circuit arrangement having battery contactors to the DC voltage network; and an electric machine including a rotor and a stator, wherein at least one of the rotor or the stator is connected to at least one of a first power electronics assembly or a second power electronics assembly actuated by way of the control device, wherein the first power electronics assembly and the second power electronics assembly are included in the DC voltage network, wherein the circuit arrangement having battery contactors is different from the first power electronics assembly and the second power electronics assembly included in the DC voltage network, wherein the at least one of the first power electronics assembly and the second power electronics assembly includes a circuit arrangement by which a freewheeling condition and an active short circuit condition can be produced for a winding of the rotor and the stator, to the DC voltage network, wherein one of the first power electronics assembly or the second power electronics assembly includes an inverter formed by the circuit arrangement, wherein the control device, in response to a primary fault signal indicating a fault, actuates at least one of first power electronics assembly or the second power electronics assembly to produce the freewheeling condition for the rotor and the stator, and wherein the control device, after the freewheeling condition is produced for the rotor and the stator, checks for presence of a secondary fault signal indicating a nonreceptiveness of the battery for power fed by the electric machine to the DC voltage network due to an opening of the battery contactors of the circuit arrangement while the primary fault signal continues to indicate the fault, wherein the control device, in response to determining that the secondary fault signal indicating the nonreceptiveness of the battery for power fed by the electric machine to the DC voltage network due to the opening of the battery contactors of the circuit arrangement is present while the primary fault signal continues to indicate the fault, actuates the first power electronics assembly and the second power electronics assembly to produce the active short circuit condition.

\*    \*    \*    \*    \*